UNITED STATES PATENT OFFICE.

EDWIN M. CHAFFEE, OF PROVIDENCE, RHODE ISLAND.

IMPROVEMENT IN THE MANUFACTURE OF WATER-PROOF HOSE.

Specification forming part of Letters Patent No. 58,377, dated October 2, 1866; Reissue No. 4,888, dated May 7, 1872.

*To all whom it may concern:*

Be it known that I, EDWIN M. CHAFFEE, of Providence, in the county of Providence, State of Rhode Island, am sole owner of certain Letters Patent for a new and useful Improvement in the Manufacture of Water-Proof Hose, granted to me October 2, 1866; that I deem said patent inoperative by reason of a defective specification; and I do hereby declare that the following is a full, clear, and exact description of my said invention, which will enable others skilled in the art to make and use the same.

Prior to my invention attempts had been made to line a woven seamless hose of fibrous material with india-rubber, but all of them had failed, from various causes, to make an article sufficiently good and cheap, or failed entirely in the manufacture, because the process which could line a short piece failed to line a piece long enough to be useful, or supply a demand for the customary length of fifty feet in a single piece; and others, if attempted to be prosecuted, did or would have failed by reason of the weakening of the fibrous material composing the woven hose by the high temperature recommended for vulcanization; besides which, without the interposition of the adhesive rubber stratum, hereinafter alluded to, the lining would not sufficiently adhere, and no process then known was in operation or capable of furnishing the market with a good article, or any at all, and none had been made, except in too short pieces or samples to experiment with, and which did not recommend themselves sufficiently to the trade to be wanted for use.

On finding that none of the patented methods were in use to supply the market with such a light and desirable article, and believing that if any could be produced by the known methods they must necessarily be of such inferior quality as not to be useful, I devised or invented the very cheap and practical method of producing a light and flexible water-proof hose in the manner and by the means hereinafter described, which has been in successful operation for more than three years.

The object to be accomplished in making water-proof hose by lining the woven tube with a tubular lining of vulcanized or vulcanizable sheet-rubber or gutta-percha was to make the two adhere securely together, which I succeeded in doing by interposing between the fibrous and rubber tube a thin stratum of india-rubber cement, which I prefer to be vulcanizable, and which is always more adhesive when dried than a sheet of the same vulcanizable compound produced without solution. This I accomplish by first applying the cement to the inside of the woven tube, as hereinafter described. Another thing to be accomplished is the introduction of the sheet-rubber tube, and to bring the surfaces which are to adhere into a fair and close contact, which latter I accomplish by inflating the sheet-rubber tube or lining after closing up its ends, and by introducing air under pressure through a tube in the closed ends—a method employed by me more than thirty years ago in making and supplying the market with thousands of feet of india-rubber-cloth hose, an article patented by me.

The introduction and cementation of the sheet-rubber lining to the inside of the woven hose is fully described hereinafter.

This invention refers to a new method of making water-proof hose by lining a woven and seamless hose on the inner surface with india-rubber or gutta-percha, or other flexible and vulcanizable gums.

In carrying out my invention, I first cement the inside of the hose by putting a quantity of india-rubber cement into one end of the hose, which is then spread upon the inner surface by drawing or forcing a piston or ball of wood or suitable material and of suitable size (egg shape preferred) through the hose by means of a rod or cord, and thereby the cement is carried through the hose, leaving a thin coating adhering upon its inner surface. This operation is to be repeated after each coat is dry until the rubber coating is sufficiently thick to be water-proof. When, however, it is designed to introduce a sheet-rubber lining, it need not be made water-proof with cement.

In drawing the piston or ball through the hose it is obvious that one end at least of the hose must be held or secured, and in such a way as to leave the end open for the ball to enter. I prefer to secure both ends in the same way, and to apply force to whatever it is secured to, producing more or less tension in the hose. This I originally did by putting some strain upon the hose in securing its ends to the ends of the trough in which it lay, as hereinafter referred to. A sufficient tension will secure the hose from collapse without the aid of a trough. If more than four to six coats of cement are required for a water-proof coating, (which may be in a coarse fabric,) I then prefer only one or two coats of cement, and then insert a lining of thin sheet-rubber or gutta-percha of a vulcanizable compound, which is done as follows: A strip of sheet-rubber of sufficient length and breadth is cemented together at the edges, making a tubular hose-lining a little smaller than the hose to be lined. The inside of the lining (before making up) is to be made non-adhesive, which may be done by varnish, solution of soap, or by dusting it to prevent the inner surfaces from sticking together when it collapses, as of course it does collapse in making up and afterward. Upon one end of this lining a piece of cloth is cemented, to which a cord is attached, by which it is drawn in a collapsed state into a tin or other tube. This tube, which is about a quarter of an inch less in diameter than the hose to be lined, is then forced or drawn into the hose, carrying the lining with it, which is then held or secured at one end while the tin tube is withdrawn, leaving the lining within the hose. The hose (after removing it from the trough, if it is there when the lining is put in) is then collapsed upon the lining, and a hand-roll about one inch long is passed over and along the center of the collapsed or flattened hose, taking care not to approach the edges. After this the hose is turned up edgewise and collapsed or flattened the other way, bringing fresh unrolled surfaces together in a position to be rolled as before, and then by continued rolling all over the surface of the hose the lining may be firmly secured or cemented; or by inserting within the lined hose a piece of gas-pipe or other rod] the rolling may be completed upon it, causing the lining to adhere firmly to the inside of the hose.

Instead of collapsing the woven tube to bring the surface of the lining and hose together, I bring them together by filling the lining with air or other fluid or liquid by means of a force-pump or otherwise, which stretches the lining to the size of the hose and causes it to adhere to the inside sufficiently to enable me to insert the gas-pipe or rod and complete the rolling, as before; or the rolling may be completed by collapsing the hose in various positions and roll with a hand-roll or pass it between pressure-rolls. A great pressure of air would accomplish the adhesion without rolling.

The hose may be secured from collapsing while the cement is drying by placing it in a trough too narrow to allow it to spread and collapse, and while there the cementing may be performed.

A rubber lining may be inserted in the following manner: A rod which is a little smaller than the hose should have the lining formed upon it with the adhesive side next to the rod, and the outside may be varnished or otherwise made non-adhesive. One end of the lining should be turned over, like a hem, about one inch, but not cemented, thus bringing so much of the adhesive side out, and then insert that much of the rod and lining into the end of the cemented hose, and by pressure cement the lining (so much as is turned over) and the hose together, and then by forcing the rod farther in the lining becomes turned inside out, and in this way the rod may be passed entirely through the hose, leaving the lining within it, which may be inflated and rolled, as before; or it may be pressed or rolled upon the rod as it passes through.

To facilitate the entrance of the rod into the hose, it should first be inclosed with its rubber covering within a tin or other tube, and the end of the tube where the lining connects with the hose, as before described, should also temporarily connect at the same place with the hose air-tight, so that when air is forced into the outer tube (the other end being closed) and occupies the space between it and the lining which covers the rod it will help to force the rod into the hose and at the same time inflate the lining as it leaves the rod, while turning inside out, and causing it to adhere to the inside of the hose. In this way the rod passes entirely through the hose, and as it moves along the lining is transferred from the rod to the hose. Water, instead of air, may be used, which will float the rod in.

As a substitute for the tin tube in the first method, I propose to use glazed cloth or strong paper to wrap the collapsed rubber lining in and draw both together into the hose in a collapsed state and afterward withdraw the wrapper. The wrapper may have its edges sewed or cemented together, thus making a tube of itself, to be used instead of the wrapper above mentioned.

When the lining of the hose is long and thin it is liable to be stretched or broken on withdrawing the tube or its equivalent, to prevent which I cement longitudinally, about half an inch apart, fine twine or sewing-thread to the under side of the collapsed lining before it is drawn into the tin or other tube, which strengthens it for that purpose, and for the purpose of withdrawing the tube also.

The vulcanization may be performed in any known manner, but I prefer it to be done in a chamber the full length of the hose, heated by steam-pipes, and at a temperature of about 250°, which is sufficient when the oxide of lead is used in the vulcanizable rubber compound.

One advantage which hose possesses besides lightness, when prepared in this way, is, it takes more naturally the collasped form in which it is woven, and therefore occupies the least possible space when wound upon a reel; besides, this method prevents the liability to damage to which hose is subjected when coated upon the outside and afterward turned outside in, as has been attempted.

I am aware that an attempt had been made previous to my invention to interpose between the sheet-rubber lining and the woven tube a thin adhesive stratum of india-rubber for the purpose of securing the tubular lining and the woven tube together; but as the lining in that attempt was to be introduced while the cement was soft and plastic, its first effect was to soften the lining and make it tender, and the cement immediately hardening the lining becomes fixed and further progress arrested and the insertion of the lining impossible in the manner set forth, except for very short pieces; besides, if the cement could be introduced in the manner described, it could not be repeated as set forth, without cementing the collapsed woven tube together, so that it would be impossible to separate them by any means set forth without damaging it for a water-proof coating.

As nothing had been accomplished by means above alluded to, and as my introduction of non-plastic (non-plastic when dry) but adhesive lamina was successful—

I therefore claim—

1. A water-proof hose made by securing the sheet-rubber lining to the woven tube by the interposition of adhesive india-rubber or its compounds between the vulcanizable tube or lining of sheet-rubber or gutta-percha, whereby a vulcanized lining is secured to the woven tube.

2. A water-proof hose made by lining the interior of a woven seamless tube with sufficient coating of vulcanizable cement of rubber or gutta-percha, or their compounds.

3. The method, substantially as herein described, of lining hose of woven fabric with india-rubber, gutta-percha, or other vulcanizable gum, or their compounds, on the inside by means substantially such as set forth, or by other equivalent means.

4. The use of the tin tube or its equivalent, for the purposes herein described.

5. Strengthening the lining by the above-described longitudinal threads or their equivalent, substantially as set forth.

EDWIN M. CHAFFEE.

Witnesses:

E. M. CHAFFEE, Jr.,

HENRY E. FORD, Jr.